Dec. 2, 1958 C. J. FLETCHER 2,862,566
ROR BOOST POWER SYSTEM PROVIDING BOUNDARY LAYER
CONTROL IN COMBINATION WITH AFTERBURNING
Filed Jan. 10, 1957
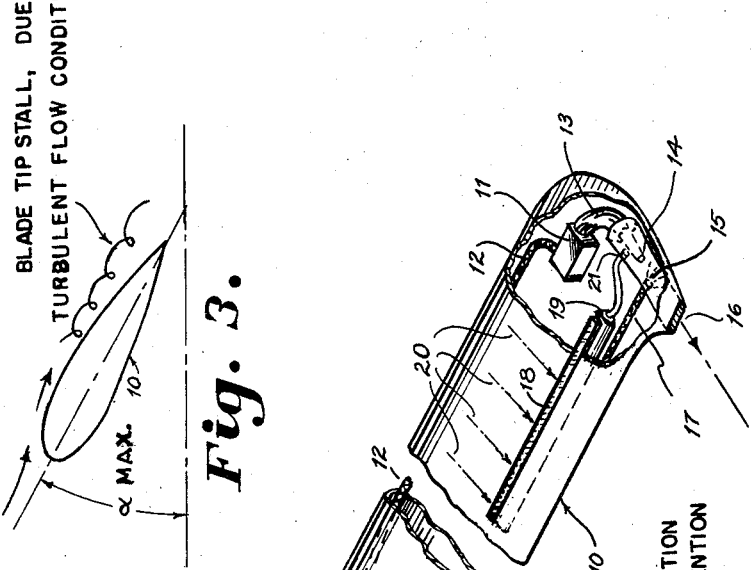
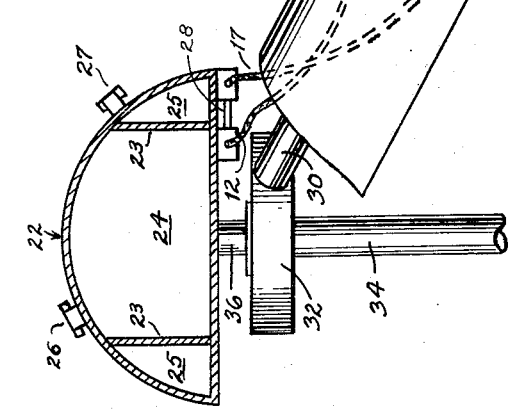
*Charles J. Fletcher*
INVENTOR
ATTORNEY

United States Patent Office 2,862,566
Patented Dec. 2, 1958

2,862,566

ROR BOOST POWER SYSTEM PROVIDING BOUNDARY LAYER CONTROL IN COMBINATION WITH AFTERBURNING

Charles J. Fletcher, Sparta, N. J., assignor, by mesne assignments, to the United States of America as represented by the Secretary of the Navy Application January 10, 1957, Serial No. 633,514

4 Claims. (Cl. 170—135.4)

The present invention relates to an apparatus and method of boundary layer control for aircraft. More particularly, the invention is directed to a novel arrangement and means for drawing in air moving over a portion of the surface of an aircraft into an interior portion of said surface, and subsequently discharging the drawn-in air to the atmosphere.

According to a preferred embodiment of these improvements, an airfoil, such as a stationary or rotary wing, has a light weight power plant system mounted therein or thereon.

A modified rocket motor or jet engine of the type commonly referred to as an ROR (Rocket on Rotor) unit is satisfactory for use in the present improvements. The usual rocket motor unit is modified by the addition of an afterburner in series. Jet fuel and boundary layer air are fed to the afterburner where they mix with jet engine normal exhaust so as to simultaneously provide effective boundary layer control and thrust augmentation to the power plant.

It will be understood that the modified jet or rocket engine provides thrust power to drive an aircraft forwardly or to rotate the rotor of a helicopter. It need not be the only source of power or thrust for the rotor or aircraft on which it is mounted.

At higher blade angles of attack, such as during take-off and emergency conditions, the phenomenon known as "blade tip stall" commonly occurs in helicopters. This occurs because the air velocity at the tip of the blade is greater than at the hub. When a certain angle of attack of the blade is exceeded, the boundary layer air at the surface nearest the rotor blade tip, especially on the retreating side, will be first to change from laminar flow to turbulent flow, thus limiting the angle of maximum lift for any given load. It is therefore highly desirable to draw off this boundary layer air from the wing surface, especially at the retreating side of the rotor blade tip, in order to prevent blade tip stalling at the higher angle of attack and to help eliminate rotor vibration which usually results from this condition. However, prior attempts to draw off boundary layer air from the surface of aircraft have necessitated the use of auxiliary equipment which resulted in excessive increase in bulk and weight.

One of the great advantages of a rocket engine is that when occasion requires it can produce extremely high thrust and additional quick power, independently of altitude, and in spite of adverse conditions of temperature and humidity. For this reason, where vertical flight is desirable because of limited take-off and landing space, rocket engines have come into wide use in the wings of aircraft, including the rotary wings of helicopters. However, insofar as is known, such installations differ materially from the present improvements, and among other things do not contemplate the removal of boundary layer air and the subsequent use of the air in the manner described herein.

The types of jet engines used in the past on helicopter rotor blades have been primarily of two fundamental types: first, the ram-jet type, consisting of a divergent duct and flame ring, wherein the initial velocity of the entrance air is the source of kinetic energy used for compressing the air for combustion; and second, the turbine-blower compressor driven jet, where the compression for the jet reaction is supplied by an engine-driven blower located, usually, within the fuselage. Because of large bulk and weight, however, these two types of jet engines have inherent disadvantages when used at the tips of helicopter rotor blades.

A third type of engine preferred for the present invention, the ROR (Rocket on Rotor) type, has none of the disadvantages of bulk and weight. This type of power plant is a variable thrust rocket system, extremely compact and very light in weight. A single liquid (monopropellant) fuel is usually used (although for the purposes of this invention, bi-propellant systems of fuel and oxidant may also be used), the monopropellant being, for example, 90% unstabilized hydrogen peroxide, supplied to each engine (located at the rotor tips) by centrifugal pumping action brought about by the rotation of the helicopter rotor. Thrust variation is attained by varying the propellant flow rate. At the blade tips, the fuel enters the rocket engines, in each of which is a metal catalyst, such as a silver screen. Upon contact with the catalyst, the hydrogen peroxide immediately decomposes into oxygen and steam to produce thrust.

Although such light weight ROR units have been previously mounted on the tips of helicopter rotors, to provide increased power during take-offs, landings, and emergency conditions of flight, so far as is known, no consideration has been given to their use in combination with a system to eliminate the blade tip stalling which usually occurs at the higher angles of attack, and at the same time to increase the thrust of the present types of jet systems by the compound means hereinafter described.

One object of this invention, therefore, is to provide a new and improved means for removing boundary layer air from an airfoil by inspirating said boundary layer air into an afterburning chamber.

A further object of this invention is to provide an efficient and economical means for increasing the thrust power of a jet engine by providing an afterburner in which boundary layer air is mixed with added fuel and with exhaust gases from the jet engine.

Still another object of this invention is to provide a means for eliminating blade tip stall in rotary wings of aircraft by drawing off boundary layer air from the rotor surface and utilizing this air by proper mixture within an afterburner.

Still another object of this invention is to provide a rotor tank for containing both oxidant and inflammable fuel to insure a simultaneous and uniform flow of both oxidant and fuel as a common propellant valve is opened.

Other objects and advantages of the present invention will be apparent from the description, the accompanying drawings, and the appended claims.

In the drawings, wherein like reference numerals designate like parts throughout the figures thereof:

Figure 1 is a fragmentary perspective view, partially in section, of an aircraft, showing one embodiment of the present invention in conjunction with the rotor of a helicopter.

Figure 2 is a diagrammatic view of an aircraft airfoil, showing the air flow over an airfoil surface in which the present invention is embodied.

Figure 3 is a diagrammatic view of an aircraft airfoil, showing turbulent air flow over a surface under certain conditions and without the present invention.

Referring now to the drawings, an airfoil is indicated generally by 10, which in the embodiment illustrated is a helicopter rotor. The airfoil-shaped rotor 10 carries a longitudinally extending rod or the like 30 on the inner end thereof which is rigidly connected by any suitable means (not shown) to a hub member 32 carried by a rotatable shaft 34. Hub member 32 is fixedly attached to rotatable shaft 34 by any suitable means (not shown) for rotation therewith and thereby imparts rotation to the rotor 10 about an axis defined by the axis of rotation of shaft 34. Shaft 34 may be rotatably driven by any suitable power source (not shown), such as an internal combustion engine, which per se forms no part of the present invention. Mounted within the airfoil in the outer end portion thereof is a jet engine, or reaction motor 11, which includes the type of motor known as an ROR (Rocket on Rotor) engine. A monopropellant such as hydrogen peroxide is fed to the engine 11 through propellant feed line 12, and instantaneously turns into steam and oxygen upon coming in contact with a catalyst, such as a silver screen (not shown) in the engine 11. The exhaust gases from the engine 11 leave through exhaust gas conduit 13 and forcefully enter the afterburning chamber 14. A fuel injector 15 introduces a fuel, such as a JP (inflammable type) fuel into the afterburner through conduit 17. The exhaust gases from the afterburner 14 are ejected through opening 16 into the atmosphere giving the thrust to the rotor.

Boundary layer air 20, travelling over the airfoil surface is inducted into the opening 18, which is formed in the airfoil. A duct 19 within the interior of the airfoil joins the wing slot opening 18 with the afterburner 14 through the inlet 21. Ignition means (not shown) may also be provided, where necessary, in the afterburner 14 to ignite the gases therein.

A fuel tank with a plurality of compartments is shown generally at 22 and is carried on the upper or free end 36 of shaft 34. Tank 22 is rigidly connected to the shaft end 36 by any suitable means (not shown) for simultaneous rotation with the shaft 34 and is carried or positioned on the shaft end 36 such that the geometrical longitudinal axes of the shaft 34 and tank 22 are substantially coaxial. Walls 23 are used to divide the tank into separate compartments, such as compartment 24 for oxidant monopropellant type fuel, and compartment 25 for inflammable type JP fuel. The propellant and fuel are placed into their separate compartments through openings 26 and 27, respectively. With the arrangement shown, the tank 22 is centrally located in relation to multiple rotor blades 10 of a helicopter, and the centrifugal force of the rotating blades will serve to feed the propellant from the tank without the need for a separate fuel pump. In order to simultaneously control the flow of both propellant to the jet engine and fuel to the afterburner, a joint purpose propellant valve 28 is provided in the fuel and propellant conduits 17 and 12.

In operation, ROR operation usually is required at higher blade angles of attack. The propellant valve 28 is opened as required, feeding both propellant to the engine through conduit 12 and fuel to the afterburner 14 through conduit 17. As decomposition of the oxidant takes place within the silver screen catalyst of engine 11, the hydrogen peroxide, or other oxidant, decomposes into steam and oxygen. These exhaust gases, containing an oxidizing agent, receive a spray of fuel through injector 15, resulting in afterburning of the gases and a consequent increase in the ROR thrust. The combined thrust of the engine and the afterburning creates a considerable jet pump or inspirating action to draw boundary layer air 20 through opening 18, through duct 19, and into the afterburner through inlet 21.

The proposed system of this invention can be installed in existing helicopters by modifying merely a few feet of the blade tip.

As an alternate to the type of engine illustrated, using hydrogen peroxide as a monopropellant, it should be understood that other types of jet or rocket engines may be used without departing from the spirit or scope of the invention. For example, other monopropellants or a combination of fuel and oxidant may be fed to the engine. Furthermore, when such alternate types of engine are used, appropriate alternate construction of the fuel and propellant tank 22 may be made without departing from the spirit or scope of the invention. Such alternate construction would include a rearrangement or increase in the number of compartments in the tank 22. However, for purposes of light weight and space saving, the monopropellant type rocket engine here illustrated is preferred for use in helicopter rotors.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention set forth in the appended claims.

Having thus described the invention, what is claimed is:

1. In a helicopter rotor assembly including a power driven shaft rotatable about a fixed axis, an airfoil-shaped rotor blade operatively connected at the inner end thereof to said shaft for rotation therewith about said fixed axis, said airfoil-shaped rotor blade having an elongated slot therein in the outer end portion adjacent the trailing edge thereof, said slot extending substantially longitudinally of said rotor blade and having one end thereof terminating adjacent the outer tip of said rotor blade, a reaction engine carried within said rotor blade in the outer end portion thereof, an afterburner operatively connected to said reaction engine and having an exhaust aperture positioned in the trailing edge of said rotor blade at the outer tip thereof, a fuel tank having a plurality of compartments therein carried by said power driven shaft and being rotatable therewith, conduit means connecting said reaction engine with one of said compartments in said fuel tank and thereby being operable to supply said reaction engine with fuel, conduit means connecting said afterburner and another of said compartments in said fuel tank and thereby being operable to supply said afterburner with fuel, duct means in said rotor blade communicating with said elongated slot therein, and means connecting said duct means and said afterburner for establishing a flow passage between said elongated slot and said afterburner, the combustion of fuel in said afterburner and the passage of exhaust gases therethrough being operable to remove the boundary layer of air from said rotor blade outer end portion by inspiring said boundary layer of air from said outer end portion into said elongated slot and through said duct means and said last named means into said afterburner.

2. A helicopter rotor assembly as claimed in claim 1 wherein said operative connection between said power driven rotatable shaft and said rotor blade includes a hub member carried by said rotatable shaft and a longitudinally extending rod carried on the inner end of said rotor blade, said longitudinally extending rod being rigidly connected to said hub member.

3. A helicopter rotor assembly as claimed in claim 1 further including valve means in said conduit means supplying said reaction engine and said afterburner with fuel.

4. A helicopter rotor assembly as claimed in claim 1 wherein said compartmented fuel tank is provided with at least two compartments therein and houses a monopropellant fuel in one of said compartments and houses an inflammable-type fuel in another of said compartments, said reaction engine being supplied with said monopropellant fuel and said afterburner being supplied with said inflammable-type fuel.

References Cited in the file of this patent

UNITED STATES PATENTS

| | | |
|---|---|---|
| 2,516,489 | Stalker | July 25, 1950 |
| 2,547,936 | Grow | Apr. 10, 1951 |
| 2,670,049 | Christie | Feb. 23, 1954 |
| 2,735,263 | Charshafian | Feb. 21, 1956 |
| 2,745,498 | Nagler | May 15, 1956 |
| 2,754,655 | Holzwarth | July 17, 1956 |